July 21, 1959 C. H. WEBBER 2,895,353
MECHANISM FOR CONTROLLING THE FLOW OF FLUIDS UNDER PRESSURE
Filed June 11, 1957 3 Sheets-Sheet 3

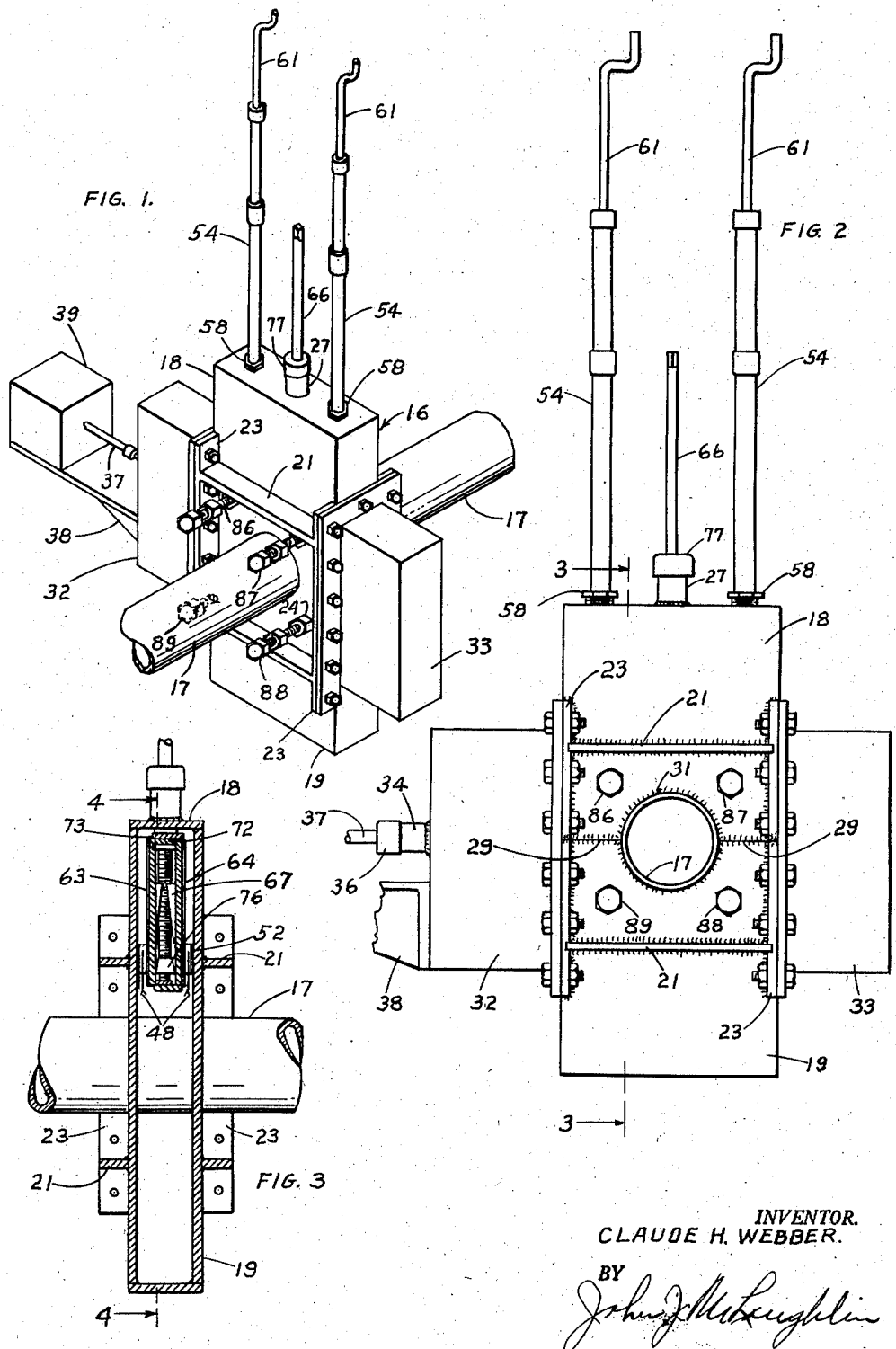

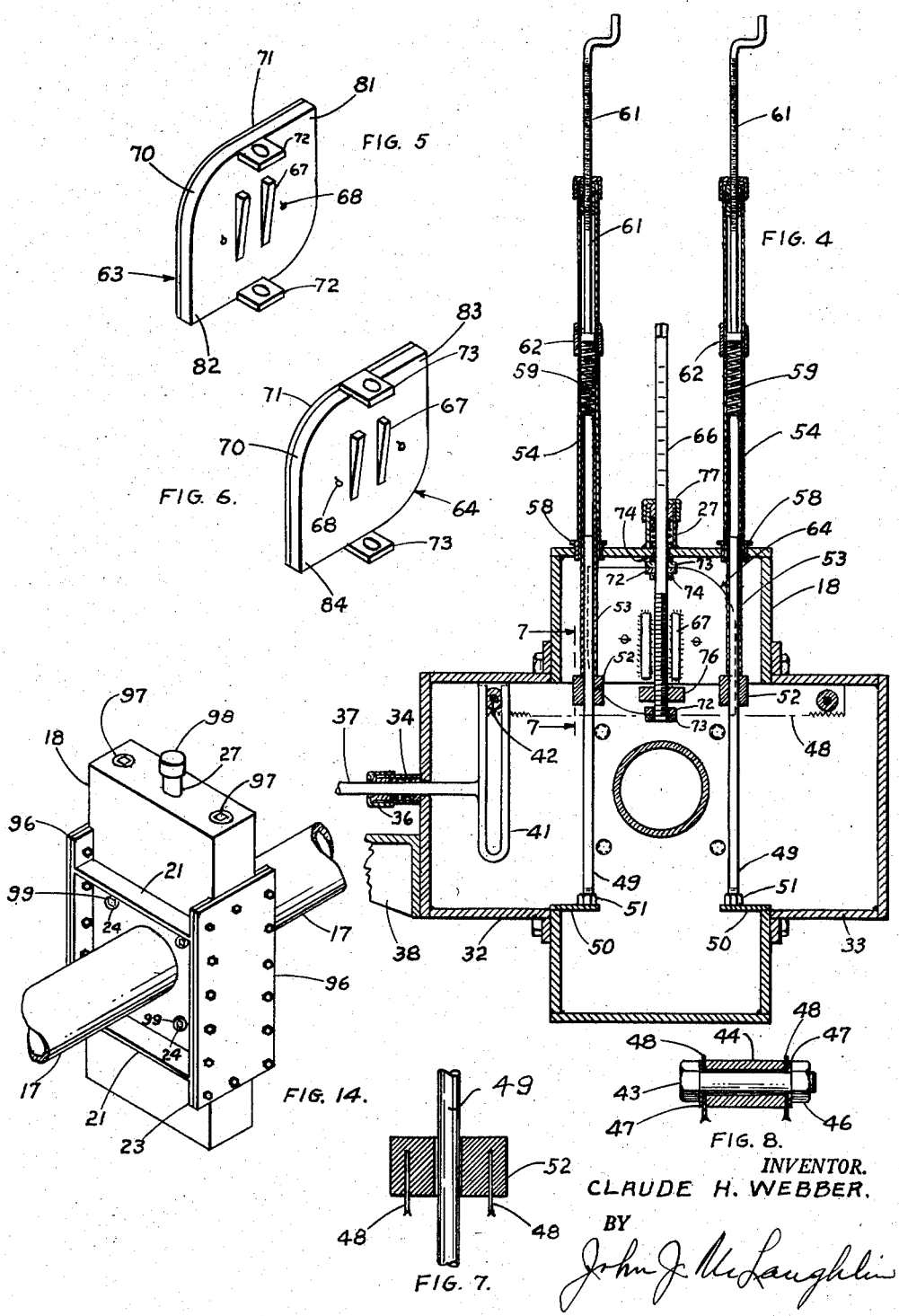

INVENTOR.
CLAUDE H. WEBBER.
BY
John J. McLoughlin

United States Patent Office 2,895,353
Patented July 21, 1959

2,895,353

MECHANISM FOR CONTROLLING THE FLOW OF FLUIDS UNDER PRESSURE

Claude H. Webber, Tucson, Ariz., assignor to Mueller Co., Decatur, Ill., a corporation of Illinois Application June 11, 1957, Serial No. 665,082

9 Claims. (Cl. 77—41)

My invention relates to a mechanism for controlling the flow of fluids under pressure in pipes comprising transmission and distribution lines. It relates more in particular to improved means forming a part of such mechanism for cutting a coupon from a pipe line enclosed within a housing, and improved means for positively operating a valve mechanism to control the flow of fluid under pressure within and through the housing.

My present application is a continuation in part of my prior patent application, Serial No. 261,885 filed December 15, 1951, now abandoned.

While my invention may be utilized for the control of any fluid under pressure, it is primarily intended for and has its greatest utility in the control of combustible gas transmission and distribution lines. It will therefore be described in such connection.

In systems for distributing combustible gases, pressures of two atmospheres to several hundred pounds per square inch are utilized depending upon the size of the pipe, the distance over which the gas is being conveyed, and the relative proximity to the point of use. In general, larger pipes carry higher pressures than smaller pipes, but this is by no means universal. In gas distribution systems, valves are conventionally placed at locations where it is expected that it will be necessary or desirable to cut off or reduce the flow, particularly in the relatively smallest lines immediately adjacent points of use such as gas lines leading to dwellings and used for domestic purposes. It is never possible, however, to anticipate in all instances the locations where control of gas under pressure will be necessary, particularly in transmission lines of relatively large diameter. Because of the high pressures involved in such lines it is not sufficient that the flow of gas be cut off near its source or between a leak and the source, because the large amount of gas in the system will cause back flowing until the leak is repaired.

Equipment has been produced and is available for emergency insertion of valves in gas lines. In general, however, such equipment is costly and frequently is usable only on a pipe of a pre-determined size. Such equipment as is available, moreover, has for its purpose the insertion of a standard type valve, such as a gate valve, within the pipe line. Frequently the condition requiring control of flow is relatively temporary and it is unnecessary to go to the expense of inserting a standard type gas valve fitting.

In accordance with my invention, I provide a housing so constructed that it may readily be welded about a pipe line so as to enclose a portion thereof, provide means for cutting a coupon from the gas line, leaving two oppositely-facing pipe line ends generally in planes parallel to each other, and insert a simple type of valve mechanism comprising two valve plates adapted to be forced against the cut pipe ends to control flow. The means for adjusting the valve plates against the pipe ends comprises a fulcrum and wedge mechanism forming a part of the assembly for expanding the valve plates, additional mechanism for more positively forcing a single valve plate against a pipe line cut end to prevent flow when relatively high pressures are involved, and similar mechanism to force a plate away from a cut pipe end when pressure within the housing tends to hold the valve plate against the cut pipe end.

The principal object of my invention is the provision of an improved, relatively inexpensive mechanism for the emergency control of the flow of fluids under pressure.

Still another object is the provision of such control means which may be utilized for several different sizes of pipe.

A further object is the provision of improved means for cutting a coupon from a pipe line to leave pipe ends adaptable for use as valve seats.

Still another object is the provision of additional means, over and above a relatively standard type of valve plate mechanism, for positively controlling the movement of a valve plate along the axis of a pipe line.

Other specific objects and features of the invention will be brought out in connection with the following description taken with the accompanying drawings, in which Fig. 1 is a perspective view showing a preferred form of the pressure controlling mechanism secured around a pipe line;

Fig. 2 is a fragmentary side elevational view looking toward the end of the pipe line within which pressure is to be controlled;

Fig. 3 is a vertical sectional view taken on the line 3—3 of Fig. 2;

Fig. 4 is a sectional view taken along the line 4—4 of Fig. 3;

Figs. 5 and 6 are isometric views showing the construction of the two valve plates;

Fig. 7 is a sectional view showing the construction of a hack saw blade guide with a fragmentary portion of its guide rod in elevation;

Fig. 8 is a sectional view showing the means for spacing the hack saw blades during cutting;

Fig. 14 is a perspective view similar to either Fig. 1 or Fig. 12 but showing one manner of sealing off the housing after the equipment has performed an emergency operation and the mechanism within the housing is removed.

Figure 13:
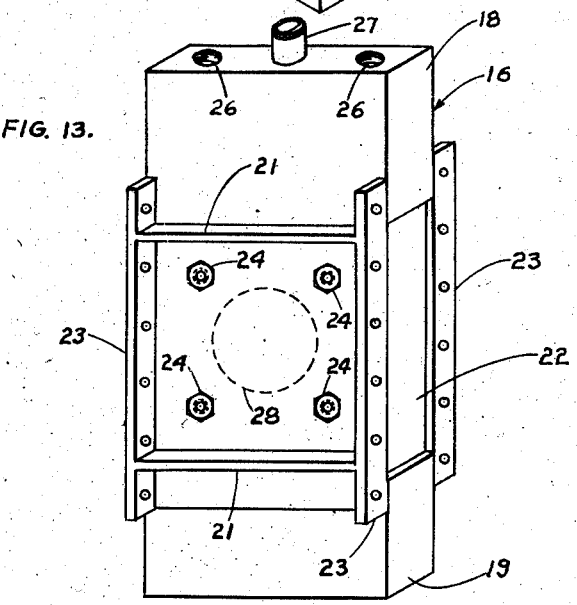
Fig. 13 is an isometric view showing the housing before its attachment to a pipe line and before the cutting mechanism and valve controlling mechanism are associated with it.

Referring now to the drawings, a housing generally indicated by the reference character 16 and shown particularly in Fig. 13 is provided for attachment to a pipe line 17 to enclose a portion thereof. The housing is generally rectangular and is preferably formed of sheet steel of suitable gauge and type to withstand the maximum pressures which will be encountered. It has an upper portion 18 comprising a cap and bottom portion 19 comprising a sump. At its midpoint, reinforcing flanges 21 are provided defining a generally rectangular reinforcing structure. Openings 22 are provided at the sides with extending flanges 23 for attachment of suitable closure members as will be described, the longitudinal portions of the flanges comprising a part of the flange structure 21. At the center portion of the housing on opposite sides thereof and within the frame work defined by the flange structure 21 are four nuts 24 welded to the face of the housing and defining the corners of a square. Threaded openings 26 are provided at the top of the housing in the cap portion, and an exteriorly threaded boss 27 is placed between the threaded openings 26 and over an opening substantially at the center of the top portion of the cap.

To place the housing around the pipe line 17, a central hole is cut at each side of the housing substantially centrally of the portion defined by the flange structure 21 such as indicated by the dotted line 28 in Fig. 13. A cutting torch is suitably used for this operation. The housing is then cut completely in two parts with horizontal cuts and fitted around the pipe line 17. It is then welded in position as shown by the lines of weld 29 and 31 in Fig. 2. When the housing has been so placed, the remaining mechanism is associated with it for cutting the pipe and valving off pressure without at any time permitting the escape of gas from the housing.

Secured to opposite sides of the housing by application of the flanges 23 are cover members 32 and 33 (see Fig. 4). Cover member 32 is provided with an exteriorly threaded boss 34 which in turn has a cap 36 for the formation of a stuffing box or gland through which a hack saw blade operating rod 37 is adapted to extend. A bracket 38 carried by the cover member 32 supports a suitable motor 39 (Fig. 1) for the reciprocation of the rod 37. This may be any conventional type motor operated either by compressed air, electricity, or the like.

The cover member 33 provides access through which the saw blade assembly, saw blade guide mechanism, and valve mechanism may be assembled. It also provides space running transversely of the housing for the operation of the saw blades.

Within the housing, the operating rod 37 carries a vertically disposed bifurcation 41 (see Fig. 4) for engaging a rod 42 connected between the saw blades so that the blades may be moved downwardly as the sawing operation proceeds. The saw blades are held in parallel relation by suitable means including (as shown in Fig. 8) a bolt 43, spacer 44, nut 46, and lock washers 47—the saw blades 48 being clamped between the spacer 44 and lock washers 47. The rod 42 may comprise part of a similar construction to that shown in Fig. 8 in which the spacer 44 is recessed at its center to receive the prongs of the bifurcation 41.

To guide the saw blades, two guide rods 49 (Fig. 4) are provided within the housing having their bottom ends threaded in nuts 51 welded to the interior of the housing. In the form shown in Fig. 4, extension plates 50 integral with the housing are provided for carrying the nuts 51. Each guide rod has loosely mounted thereon a guide block 52 (see Fig. 7) with bottom grooves to receive top edges of the saw blades 48. Above the blocks, sleeves 53 are provided into which the top ends of the guide rods project. These sleeves engage in upper tubulations 54 which are carried by apertured plugs 58 threaded to the threaded openings 26 (see Fig. 13). Coil springs 59 are carried in the tubulations above the sleeves 53 and engage the sleeves to force them downwardly to in turn force the guide blocks 52 downwardly against the top edges of the saw blades. Adjusting rods 61 extending through a suitable stuffing box at the top of the tubulations carry enlargements 62 at their bottom ends which engage against the coil springs 59 to hold them under compression. By adjustment of the rods 61 from time to time during a cutting operation a firm but substantially constant resilient pressure is thereby applied to the saw blades, with the result that a coupon 60 (Fig. 9) can be cut from a steel pipe line with extreme rapidity, and clean-cut ends are left on the pipe line adapted to serve as valve seats. Also enclosed within the housing is a valve mechanism comprising valve plates indicated generally by the reference characters 63 and 64, and operating rod 66 (Figs. 3, 4–6, and 9–11). The valve plates 63 and 64 are generally identical but shaped to mutually cooperate as part of the valve assembly.

Figure 9:
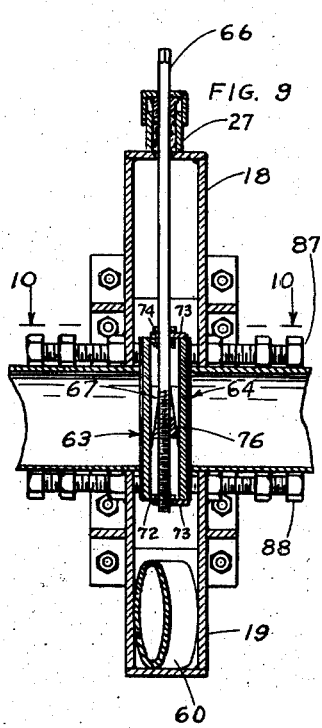
Fig. 9 is a fragmentary sectional view similar to Fig. 4 but showing the valve assembly in pressure controlling position.

Each such valve plate is provided with two fulcra 67 which, when the valve plates are assembled, face each other, and with hooks 68 for the attachment of springs 69 (see Figs. 10 and 11) which tend to hold the valve plates together. Each valve plate also comprises a metal portion 70 and a facing 71 formed of artificial rubber or the like material for facilitating sealing action against the cut pipe ends. Valve plate 63 is provided with ear-like projections 72 from its back face, while valve plate 64 is provided with similar ear-like projections 73 secured to top and bottom edges so as to be spaced from the back face. The result is that when the valve plates are assembled, as shown particularly in Figs. 4 and 9, the projections 73 are above and below the projections 72. Each of the ear-like projections 72 and 73 is provided with an elongated opening through which the operating rod 66 extends. Collars 74 (see Figs. 4 and 9) engage above and below the uppermost projections 72 and to hold the valve plates in suspended position with respect to the valve plate operating rod 66. A wedge 76 is carried on a threaded bottom portion of the operating rod 66. This wedge, as shown particularly in Fig. 9, having its wedging faces sloped in the opposite direction to the faces of the fulcra 67, will cause the valve plates to expand away from each other when the operating rod 66 is turned in a direction to draw the wedge 76 upwardly. The operating rod 66 extends upwardly through the threaded boss 27 and through an apertured cap 77 which has the function of retaining packing material within the threaded boss and around the operating rod 66 to prevent loss of pressure. The operating rod 66 as shown may have graduations to indicate the position of the valve plates when they are lowered to shut-off position, and may be slid to non-operating position as shown in Fig. 4 or operating position as shown in Fig. 9.

In addition to the valve plate adjusting mechanism already described, positive mechanism is provided for increasing the pressure of a valve plate against its seat where unusually high pressures are encountered, or to force it away from its seat when pressure within the housing develops such as to hold it against its seat notwithstanding the action of springs 69. It will be noted that each of the valve plates 63 and 64 is generally rectangular except for rounded corners diagonally facing each other, leaving square corners in the nature of projections. These square corners or projections (namely, projections 81 and 82 on valve plate 63, and 83 and 84 on valve plate 64) function to provide points of engagement for an actuating mechanism which, in the embodiment of the invention shown, extends through the housing.

Figure 11:
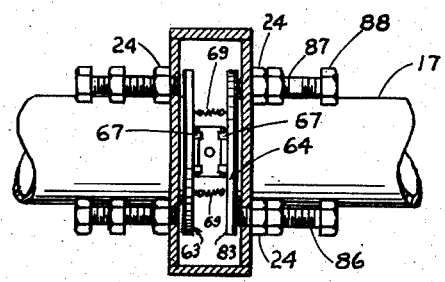
Fig. 11 is a view similar to Fig. 10 but showing the parts in a different adjusted position such as occurs when a valve plate is forced away from its seat.
Figure 12:
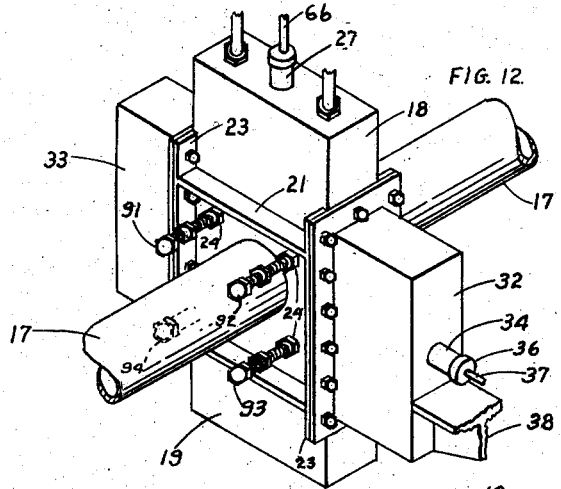
Fig. 12 is a fragmentary perspective view similar to Fig. 1 but showing the reverse side of the mechanism as contrasted with Fig. 1.

Headed actuating bolts 86, 87, 88 and 89 are threaded in the nuts 24 on one side of the housing (Fig. 1); and headed actuating bolts 91, 92, 93 and 94 are threaded in nuts 24 on the opposite side of the housing (Fig. 12). Each of such bolts is provided with a locking nut to firmly hold it in adjusted position. As shown particularly in Figs. 9, 10, and 11, the bolts 86–89 and 91–94 are in line with the projections 81–84 comprising corners of the valve plates, but will pass the valve plates in the region defined by the rounded corners thereof. By proper selection of the bolts employed, therefore, either or both of the valve plates may be forced with extremely high pressure against its seat comprising a cut pipe end, or a valve plate may be so engaged by such bolts as to force it away from its seat.

Figure 10:
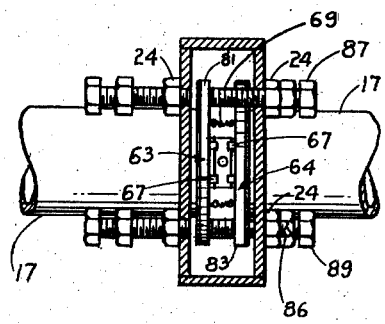
Fig. 10 is a fragmentary plan sectional view taken on the line 10—10 of Fig. 9 looking in the direction of the arrows, one of the pressure controlling bolts being broken away to show the manner of forcing a valve plate against its seat.

As an illustration of the manner in which the valve plate actuating bolts function, reference may be made to Figs. 10 and 11. In Fig. 10, bolt 87 extends over the top rounded corner of valve plate 64 and engages corner projections 81 of valve plate 63 to force it against its seat. In this figure, for convenience of illustration bolt 86 has been broken away to show the action of bolt 89 below it. Bolt 89 extends under a rounded corner of valve plate 64 and engages the corner projection 82 of valve plate 63. Thus valve plate 63, being engaged forcibly at opposite corners, is held in intimate contact with the seat comprising the cut end of pipe line 17 which is at the left of Fig. 10. By this means, even very high pressures can be confined within this portion of the pipe line 17.

In Fig. 11, valve plate 64 is in engagement with its seat comprising the cut end of pipe line 17 at the right side of the figure. Actuating bolt 86 is in engagement with the corner projection 83 of valve plate 64. In this figure, for convenience of illustration actuating bolt 87 is deleted and actuating bolt 89 is shown engaging bottom corner projection 84. Thus regardless of the pressure differential between the housing and the right side of pipe line 17, the valve plate 64 can be forced from its seat and normal pressure conditions established.

When the mechanism has been employed for its intended purpose, the housing can remain attached to the pipe line and the associated mechanism either removed completely or such part of it retained as may be desired, depending upon conditions encountered. After the valve plates 63 and 64 are seated as shown in Fig. 9, the housing cover member 33 is readily removed and the saw blade mechanism extracted. As shown in Fig. 14, a simple closure plate 96 is substituted for the closure member 33. A similar closure plate can be substituted for the closure member 32. The plates 96 are shown bolted in place, but they may be molded to the housing if desired. All of the guide mechanism for the saw blades may also be removed. In Fig. 14, plugs 97 are provided to permanently close the openings 26 through which the saw blade guiding mechanism is operated. In this same figure, the threaded boss 27 is also closed by a closure cap 98. The holes provided by the nuts 24 are also closed by plugs 99. The arrangement shown in Fig. 14 assumes that all of the mechanism employed, including the valve mechanism, has been removed. In such a case, pressure would flow directly along the pipe line 17 through the housing as if no emergency operation for fluid control had occurred. Usually, however, the valve mechanism is raised to the position shown in Fig. 4, and the actuating bolts 86-89 and 91-94 are left in position so that the valve can be used at any time in the future as a shut-off mechanism.

The pressure controlling mechanism of my invention has been described in detail so that those skilled in the art may understand the best manner of constructing the same and the manner of its operation. The scope of the operation, however, is defined by the claims.

I claim:

1. Pressure controlling mechanism of the character described comprising a housing adapted to be welded around a pipe line to seal off a portion thereof, said housing including a cap portion above the said pipe line and a sump portion below the pipe line, opposite sides of the housing spaced at right angles to the axis of the pipe line being open and provided with flanges for releasable attachment of housing covers forming a continuation of the housing in which cutting saws may operate, a pair of hack saw blades within the housing and extendible into said housing covers, said hack saw blades being supported in spaced relation to each other, guide means having slots to receive top edges of said hack saw blades, adjustable means extending through said housing cap for resiliently pressing said guide means downwardly to force the blades downwardly against the pipe line and hold them in position, and means extending through one of said housing covers for reciprocating the saw blades to cut a coupon from the said pipe line.

2. Pressure controlling mechanism as defined in claim 1 wherein said saw blade guide means and means for resiliently pressing the same downwardly comprise a pair of guide rods having their bottom ends secured in said housing and being placed in space relation between the saw blades, sleeves in which tops of said guide rods are telescoped, grooved blocks carried by bottom ends of said sleeves for top engagement of the saw blades, coil springs engaging top edges of said sleeves to force them downwardly, and means for adjusting the compression of said coil springs.

3. Pressure controlling mechanism as defined in claim 1 wherein said saw blade guide means and means for resiliently pressing the same downwardly comprise tubulations extending upwardly from said housing cap, a sleeve in each such tubulation, a rod secured within the housing below the level of the pipe line and extending upwardly into each such sleeve, grooved blocks carried at bottom ends of each sleeve for engagement of top edges of the saw blades, a coiled compression spring in each such tubulation engaging the sleeve to force the same downwardly, and an adjustable rod in each such tabulation for controlling the compression of the spring.

4. Pressure controlling mechanism as defined in claim 1 including a pair of valve plates, a supporting operating rod for said plates extending upwardly through the housing cap, fulcra on each such valve plates facing each other and a wedge threaded on said supporting rod in a position to engage said fulcra and force the said valve plates apart and against ends of a line from which a coupon has been cut by said saw blades, the said valve assembly comprising said valve plates, supporting operating rod and wedge being normally held in said cap portion of the housing, said supporting operating rod being adjustable downwardly to place the valve plates between the said pipe ends.

5. Pressure controlling mechanism as defined in claim 1 including a pair of valve plates, a supporting operating rod for said plates extending upwardly through the housing cap, fulcra on each such valve plate facing each other, a wedge threaded on said supporting rod in a position to engage said fulcra and force the said valve plates apart and against ends of a pipe line from which a coupon has been cut by said saw blades, the said valve assembly comprising said valve plates, supporting operating rod and wedge being normally held in said cap portion of the housing, said supporting operating rod being adjustable downwardly to place the valve plates between said pipe ends, and means, other than said fulcra and wedge, for forcing said valve plates in either direction axially of the said pipe line.

6. In pressure controlling mechanism of the character described, a housing adapted to be secured about a pipe line to enclose a part thereof, means within the housing for cutting a coupon from said pipe line to leave pipe ends facing each other in generally parallel planes, a valve assembly comprising a pair of valve plates and means for expanding said valve plates into contact with said cut pipe line ends, projections from said valve plates mutually staggered with respect to each other, and means extending through the housing substantially normal to said plates for engaging selected projections for forcing a valve plate in a direction along the axis of the pipe line whereby to either increase valve sealing pressure against high pressure or to release a valve plate from contact with a pipe end when pressure within the housing tends to hold the valve plate in contact with the pipe line end.

7. Pressure controlling mechanism as defined in claim 6 wherein said valve plates are generally rectangular with alternate corners square and rounded, the said plates being so disposed that a square corner on one plate faces a rounded corner on its opposite plate, the said square corners thereby defining engageable projections, and wherein said means extending through the housing comprises a series of bolts threaded through the housing in positions such that one such screw can engage each of such projections on either side thereof whereby to positively force either of such plates individually against or away from a pipe line end.

8. Pressure controlling mechanism of the character described comprising a housing adapted to be secured fluidtight about a pipe line to enclose a part thereof, means within said housing for cutting a section from the pipe line to leave substantially planar parallel opposed pipe ends, a valve assembly within said housing comprising at least one valve plate interposable between the pipe ends and movable into sealing engagement with one of the pipe ends, and means extending through said housing, operable from the exterior thereof, and including a portion movable substantially normally of and engageable with said valve plate for forcing the latter in a direction along the axis of the pipe line and out of sealing engagement with the one pipe end.

9. Pressure controlling mechanism comprising: a housing having a fluid passageway extending therethrough interrupted by a pair of opposed substantially parallel and substantially planar valve seats extending transversely of said passageway; a valve assembly within said housing comprising at least one valve plate movable transversely between said seats and normally into and out of sealing engagement with one of said seats; and means extending through said housing, operable from the exterior thereof, and including a portion movable substantially normally of said one seat and engageable with said valve plate for forcing the latter normally off of and out of sealing engagement with said one seat.

References Cited in the file of this patent
UNITED STATES PATENTS

| | | |
|---|---|---|
| 955,334 | Hoefer | Apr. 19, 1910 |
| 1,781,698 | O'Brien | Nov. 18, 1930 |